July 21, 1931.  J. S. BATES ET AL  1,815,646
PROCESS OF CAUSTICIZING
Filed Aug. 9, 1926
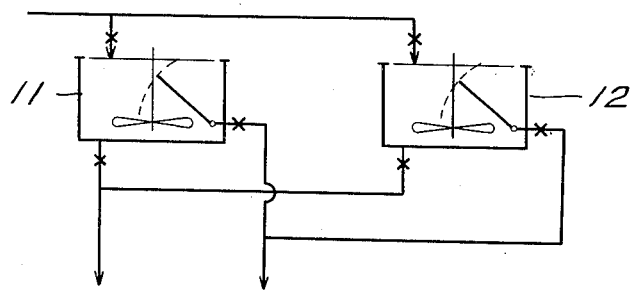
Inventors
John S. Bates
Harris S. Chalmers
Percival C. Austin
By
Attorney Patented July 21, 1931

1,815,646

UNITED STATES PATENT OFFICE

JOHN S. BATES, HARRIS S. CHALMERS, AND PERCIVAL C. AUSTIN, OF BATHURST, NEW BRUNSWICK, CANADA; SAID CHALMERS AND AUSTIN ASSIGNORS TO SAID BATES

PROCESS OF CAUSTICIZING

Application filed August 9, 1926. Serial No. 128,286.

This invention relates broadly to the art of causticizing, that is, the chemical conversion of a soluble alkali metal carbonate into a caustic alkali metal hydroxide by treatment with lime, and relates more particularly to the causticizing operations practised in the manufacture of kraft or sulphate and soda pulp.

The primary object of the invention is the more complete utilization of the lime than has been heretofore effected in causticizing operations in order to reduce the lime consumption.

Sodium carbonate and calcium hydroxide interact by double decomposition and the percentage conversion depends largely on the proportions of the substances. If theoretically equivalent proportions are used, an equilibrium is reached and the reaction stops before complete conversion is obtained. Furthermore, calcium hydroxide is only slowly soluble whereas sodium carbonate is readily soluble. These conditions necessitate the use of an excess of lime in commercial causticizing operations. For example, in the manufacture of kraft pulp, each batch of green liquor is boiled with calcium quicklime to convert the sodium carbonate of the liquor to sodium hydroxide. Because of the previously noted conditions, it is necessary in order to ensure as nearly complete conversion of the sodium carbonate as possible to use a very considerable excess of lime. When the causticizing operation is complete, there remains a lime sludge which contains the unused excess of lime. This sludge is ordinarily discarded after washing to recover alkali therefrom.

For convenience of description and to faciliate understanding of the invention, the same will be described in its application to a batch system of operation but it will be understood the invention is not confined to batch operation and applies equally to continuous systems of operation.

According to the present invention, the effects of the equilibrium condition and the tardy solubility of calcium hydroxide may be substantially avoided and substantially complete conversion of the sodium carbonate effected using but little more than the theoretical equivalent of lime, if the sodium carbonate solution and the lime are handled on a counter current flow principle enabling successive treatments of each with a molecular excess of the other. In practice this effect is produced by first treating a batch of solution with less than the molecular equivalent of calcium hydroxide and then treating the batch with the amount of lime required for conversion of the whole batch. In the first treatment the sodium carbonate is in excess and practically all the calcium hydroxide reacts with a part of the sodium carbonate while in the second treatment the calcium hydroxide is in excess, owing to previous conversion of a part of the sodium carbonate, and practically all the sodium carbonate is converted leaving an unreacted excess of calcium hydroxide. This remaining excess is used for preliminary treatment of the next batch and so on, each batch being first treated with the residual excess of the previous batch and then treated with slightly more than the calculated molecular equivalent of the whole batch. Thus, while each batch of sodium carbonate is treated with a considerable excess of lime, it will be seen that over a period of time the amount of lime required is only slightly in excess of the theoretical amount. The excess of lime required for conversion of each batch may be regarded as progressing from batch to batch and, being recoverable at the completion of the operation, may be eliminated in calculating the amount of lime actually used. The batches of sodium carbonate treated need not be exactly equal if care is taken to use for each batch a properly calculated amount of fresh quicklime. The counter current flow principle thus employed does not necessitate actual flow of both reacting substances and in practice it is preferable that a series of causticizing tanks or other suitable apparatus be employed and each used in rotation as regards the steps of the process, so as to avoid transference of lime and sludge from tank to tank.

In order that the invention may be more readily comprehended, its application to the causticizing of kraft green liquor will be explained in detail, but it must at the same time be borne in mind that the invention is not confined to this particular application but extends equally to causticizing operations in other specific processes.

Kraft "green liquor", which is a solution chiefly of sodium carbonate and sodium sulphide, is ordinarily boiled with calcium quicklime to convert the sodium carbonate to sodium hydroxide, the sodium sulphide being unaffected. The lime is changed to an insoluble sludge consisting of finely divided calcium carbonate and unconverted lime. Owing to the equilibrium condition of the conversion reaction, a very considerable excess of lime must be used to convert substantially all the more valuable sodium carbonate. The sludge is ordinarily washed to recover as much as possible of the valuable alkali.

In practising this invention for the preparation of kraft "white liquor", the "green liquor" is prepared in the usual way by dissolving the smelt in weak liquor or in water. The hot green liquor is preferably cleansed of slimy impurities, since the clear green liquor is more readily causticized. The whole or any suitable portion of the green liquor, usually one-third to one-half, is transferred to one of a series of causticizing tanks—of which only two, designated 11 and 12, are shown—for example, to the tank 11, in which there remains the lime sludge of a previous causticizing operation. This sludge occupies approximately one-quarter of the tank and consists of unchanged calcium hydroxide and finely divided calcium carbonate resulting from the previous causticizing operation. Since both the sludge and the green liquor are already hot (around 80° C.), it is not usually necessary to supply heat but steam may be blown in if desired. The mixture is agitated to expedite the reaction by keeping the sludge in suspension. Usually, agitation during 15 to 30 minutes will suffice. In this step of the causticizing, the sodium carbonate of the green liquor is greatly in excess of that required to interact with the calcium hydroxide present, and the result is that most of the calcium hydroxide is converted to carbonate. When the reaction has progressed to completion, or as far as is economical, agitation is stopped and the mixture allowed to settle. Almost immediately after agitation is stopped, it is possible to commence siphoning off the liquor, which is transferred to a second causticizing tank 12. Some of the sludge in suspension passes over with the liquor and in practice it has been found that one-third to one-half may be thus transferred without detrimental effect. In fact, there is advantage in transferring an appreciable amount to the tank 12 in that any calcium hydroxide content serves to increase the excess of calcium hydroxide in the tank 12 and has a further chance to be carbonated. It would be possible to greatly reduce the amount of sludge transferred to the tank 12 by allowing a longer time for it to settle out, but it has been found more advantageous to use as much as possible of the available time for agitation, since this increases the percentage of calcium hydroxide conversion.

The sludge remaining after this preliminary causticizing, which has only a small content of unconverted calcium hydroxide, is finally washed as may be necessary to remove the alkali and is then discharged from the system.

The liquor transferred to the tank 12 is already partly causticized. The remainder of the green liquor is now charged into the tank 12 and slightly more than the theoretical amount of lime for the entire batch is added. The mixture is agitated and boiled with steam in the usual way. Owing to the preliminary causticizing operation, the lime or calcium hydroxide present during the boiling will be considerably in excess of the theoretical amount required for conversion of the sodium carbonate present, so that practically all the sodium carbonate will be converted to sodium hydroxide. The caustic liquor (white liquor) is drawn off, leaving the lime sludge and unchanged calcium hydroxide in the tank 12 for the preliminary treatment of the next batch of green liquor after washing out as much as practical of the caustic liquor.

For simplicity of description, only one preliminary causticizing operation has been recited but it will be understood that by treating the lime sludge with successive portions of the whole green liquor batch on its way to the primary causticizing tank (and if necessary increasing the number of tanks in use) the process may be carried out in several stages. In this way the percentage excess of sodium carbonate is higher at each stage in relation to the decreasing calcium hydroxide and conditions are favorable for conversion of the remaining free lime. In practice, the number of preliminary treatments is governed by the time and tanks available and the relative convenience of operating.

Five important advantages result from use of this invention. First, the amount of lime required is materially reduced, being only a little more than that theoretically necessary. Compared with usual practice, a reduction of about 25% in the amount of lime is readily attainable with no extra equipment and without prolonging the time of and without sacrificing thoroughness of causticizing. Second, the amount of lime sludge to be disposed of is correspondingly reduced. Third, greater uniformity of results with different limes is obtained. (Some limes react less readily than others when first exposed to the sodium carbonate but have time for complete reaction in the preliminary causticizing when the carbonate is in excess). Fourth, the sludge finally discharged is more chalky and less caustic with calcium hydroxide than usual, thereby being easier to filter and less corrosive on the filter cloths. Fifth, the sodium carbonate of the causticized liquor can be reduced to an amount about half of that in usual practice by reason of the counterflow principle without increasing the proportion of lime for this particular object.

The raw lime material used may be calcium quicklime obtained by burning lime stone or lime sludge, or may be hydrated lime or milk of lime.

It will be understood that the invention, even in its application to the preparation of kraft white liquor, is not limited to the particular details herein set forth, as numerous modifications may be made, more especially when the causticizing is effected in more than two stages. For example, working in three or more stages, the entire batch of green liquor may be passed successively from tank to tank or the entire batch of liquor may be divided between two or more of the tanks and then passed through the remaining tanks without further additions, or a part of the batch may be passed through two or more tanks without addition, and the remainder of the batch added to an intermediate tank or tanks of the series or added all in the last tank. Similarly, the lime necessary for each batch may be introduced all into the one tank or may be divided between two or more tanks. Furthermore, instead of using the tanks in rotation for each stage of the process, the sludge may be transferred from tank to tank, so that each stage of the process is always performed in the same tank. In either case, the effect of counter current flow is obtained.

The invention is also applicable in principle to the soda pulp process, to the manufacture of caustic soda from soda ash and to any other causticizing process of equivalent nature.

Having thus described our invention, what we claim is:—

1. A process of causticizing alkali metal carbonate green liquor of kraft or soda pulp processes, which comprises agitating the liquor with less than the molecular equivalent of calcium hydroxide until substantially all the calcium hydroxide is converted to calcium carbonate with partial causticizing of the liquor, and then agitating the liquor with calcium hydroxide molecularly in excess of the sodium carbonate content of the liquor until substantially all the sodium carbonate is converted to sodium hydroxide.

2. A process of causticizing alkali metal carbonate green liquor of kraft or soda pulp processes, which comprises agitating the liquor with the sludge resulting from a previous causticizing operation and containing calcium hydroxide in amount less than the molecular equivalent of the sodium carbonate in the liquor until substantially all the calcium hydroxide is converted to calcium carbonate, and then agitating the liquor with fresh calcium hydroxide in amount substantially the molecular equivalent of the original sodium carbonate content of the liquor until substantially all the sodium carbonate is converted to sodium hydroxide.

3. A process of causticizing alkali metal carbonate green liquor of kraft or soda pulp processes, which comprises agitating an amount of alkali carbonate liquor with the sludge of a previous causticizing operation containing calcium hydroxide in amount less than the molecular equivalent of the alkali metal carbonate present until substantially all the calcium hydroxide is converted to calcium carbonate, partially settling the mixture and drawing off the partially causticized alkali liquor, adding a further amount of the alkali metal carbonate liquor to the partially treated liquor, and agitating the whole with calcium hydroxide in amount substantially the molecular equivalent of the alkali metal carbonate originally in both amounts of liquor, until substantially all the alkali metal carbonate is causticized.

4. A cyclic process of causticizing alkali metal carbonate green liquor of kraft or soda pulp processes, with substantially only the amount of calcium hydroxide theoretically necessary, which comprises in each cycle treating a portion of the alkali metal carbonate liquor with less than the theoretical equivalent of calcium hydroxide remaining from a previous cycle, adding another portion of alkali metal carbonate liquor to the first portion, and treating the two combined portions with fresh calcium hydroxide in amount substantially theoretically equivalent to the original alkali metal carbonate of the said two portions, the remaining unchanged calcium hydroxide of the second treatment serving for preliminary treatment in the next cycle.

5. A cyclic process of causticizing alkali metal carbonate green liquor of kraft or soda pulp processes, which comprises agitating the same in solution and at elevated temperature with sludge from a previous operation, in which sludge there remains an amount of calcium hydroxide less than the theoretical, the agitation being continued until substantially all the calcium hydroxide is converted to calcium carbonate, equivalent of the alkali metal carbonate in the liquor, separating a major portion of the solids from the liquid and boiling the liquid with additional calcium hydroxide in amount substantially the theoretical equivalent of the original alkali metal carbonate until substantially all the alkali metal carbonate is converted to hydroxide, whereby an amount of unchanged calcium hydroxide will remain in the sludge after completion of the causticizing for preliminary treatment of alkali metal carbonate in the next cycle of operation.

6. A process of causticizing alkali metal carbonate green liquor of kraft or soda pulp processes, which comprises agitating the liquor with the sludge of a previous causticizing operation containing a residue of calcium hydroxide in such proportion to the sodium carbonate content of the liquor and for such period of time that substantially all the calcium hydroxide will be converted to calcium carbonate, and then agitating the liquor with fresh calcium hydroxide in amount molecularly in excess of the unconverted sodium carbonate content of the liquor until substantially all the sodium carbonate is converted to sodium hydroxide.

7. A process of causticizing alkali metal carbonate green liquor of kraft or soda pulp processes with only a slight excess of lime, which comprises agitating successive portions of the liquor first with the sludge remaining from treatment of a previous portion and containing calcium hydroxide in amount less than the molecular equivalent of the sodium carbonate present in the portion, the agitation being continued until substantially complete conversion of the calcium hydroxide in amount substantially molecularly equivalent to the original sodium carbonate content of the liquor portion, whereby the calcium hydroxide is molecularly in excess of the sodium carbonate present in the second treatment, the agitation being continued until substantially complete conversion of the sodium carbonate to sodium hydroxide results, the sludge resulting from said second treatment and containing unconverted calcium hydroxide serving for the preliminary treatment of the succeeding portion, whereby the excess of calcium hydroxide used in treatment of the first portion is in effect transferred to successive portions and represents the total excess of lime used in treatment of an indefinite amount of liquor.

8. A process of causticizing alkali metal carbonate green liquor of kraft or soda pulp processes, which comprises agitating successive amounts of the alkali metal carbonate solution successively with materially less and materially more than the molecular equivalent of calcium hydroxide until in each agitation the reagent present in less than the molecular equivalent is completely converted, and using the unchanged excess of calcium hydroxide remaining from the final treatment of each amount for the first treatment of the succeeding amount.

In witness whereof, we have hereunto set our hands.

JOHN S. BATES.
HARRIS S. CHALMERS.
PERCIVAL C. AUSTIN.